United States Patent
Kim

(10) Patent No.: US 9,620,748 B2
(45) Date of Patent: Apr. 11, 2017

(54) RECHARGEABLE BATTERY

(71) Applicant: SAMSUNG SDI CO., LTD., Yongin-si, Gyeonggi-do (KR)

(72) Inventor: Sung-Kab Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/743,846

(22) Filed: Jun. 18, 2015

(65) Prior Publication Data

US 2016/0126512 A1    May 5, 2016

(30) Foreign Application Priority Data

Oct. 30, 2014    (KR) .................. 10-2014-0149444

(51) Int. Cl.
| | |
|---|---|
| *H01M 2/02* | (2006.01) |
| *H01M 2/08* | (2006.01) |
| *H01M 2/06* | (2006.01) |
| *H01M 2/30* | (2006.01) |

(52) U.S. Cl.
CPC .............. *H01M 2/08* (2013.01); *H01M 2/06* (2013.01); *H01M 2/30* (2013.01); *H01M 2220/20* (2013.01); *H01M 2220/30* (2013.01)

(58) Field of Classification Search
CPC ............ H01M 2/06; H01M 2/08; H01M 2/30; H01M 2220/20; H01M 2220/30
See application file for complete search history.

(56) References Cited

U.S. PATENT DOCUMENTS

| | | | | |
|---|---|---|---|---|
| 1,519,867 | A | * | 12/1924 | Marko ................... H01M 2/06 429/183 |
| 6,720,108 | B2 | | 4/2004 | Yamamoto et al. |
| 8,802,279 | B2 | | 8/2014 | Jiang et al. |
| 2012/0148884 | A1 | * | 6/2012 | Kim ....................... H01M 2/06 429/61 |
| 2014/0065472 | A1 | | 3/2014 | Naritomi et al. |

FOREIGN PATENT DOCUMENTS

| | | |
|---|---|---|
| KR | 10-2001-0052784 A | 6/2001 |
| KR | 10-2014-0033207 A | 3/2014 |

* cited by examiner

*Primary Examiner* — Jane Rhee
(74) *Attorney, Agent, or Firm* — Lewis Roca Rothgerber Christie LLP

(57) ABSTRACT

A rechargeable battery includes an electrode assembly; a case accommodating the electrode assembly; a cap plate combined with the case and having first and second terminal openings passing through the case from an inside to an outside; first and second seal gaskets inserted into the first and second terminal openings, respectively, and having insertion openings; and first and second terminals inserted into the insertion openings of the first and second seal gaskets, respectively, and electrically connected with first and second current collecting members of the electrode assembly, respectively, wherein sidewalls of the first and second gasket seals, which are brought into contact with inner walls of the first and second terminal openings, are inclined with respect to center axes of the first and second terminal openings.

7 Claims, 6 Drawing Sheets

RECHARGEABLE BATTERY

CROSS-REFERENCE TO RELATED APPLICATION

This application claims priority to and the benefit of Korean Patent Application No. 10-2014-0149444 filed in the Korean Intellectual Property Office on Oct. 30, 2014, the entire contents of which are incorporated herein by reference.

BACKGROUND

1. Field

The present invention relates to a rechargeable battery.

2. Description of the Related Art

Rechargeable batteries can be charged and discharged unlike primary batteries which are not designed to be recharged. While low-capacity rechargeable batteries are used for portable compact electronic apparatuses, such as mobile phones, notebook computers, and camcorders, high-capacity rechargeable batteries are widely used as a power source for driving a motor of a hybrid vehicle, etc.

Recently, a high-output rechargeable battery using a non-aqueous electrolyte having high energy density has been developed. The high-output rechargeable battery is configured with a high-capacity battery module by connecting a plurality of rechargeable batteries in series so as to be used for driving a motor for an apparatus requiring a large amount of power, e.g., an electric vehicle.

In addition, one battery module is normally composed of a plurality of rechargeable batteries connected in series, and the rechargeable battery may have a cylindrical shape, a prismatic shape, and the like. The rechargeable battery has a negative electrode and a positive electrode which protrude outwards, and the negative electrode and the positive electrode pass through a cap plate. In addition, a sealing member for sealing is installed between the terminals and the cap plate.

However, a fit between the sealing member and the terminal may be poor or a difference in the coefficient of thermal expansion between the sealing member and the cap plate, due to being different materials, may cause a leak. When the fit is poor and the leak is formed as described above, the sealing strength of the sealing member around the terminal deteriorates, and thus an electrolyte may leak out or moisture, or the like, may penetrate in, causing a short circuit.

The above information disclosed in this Background section is for enhancement of understanding of the background of the present invention only and therefore it may contain information that does not form the prior art that is already known to a person of ordinary skill in the art.

SUMMARY

Embodiments of the present invention provide a rechargeable battery having an enhanced sealing strength between a terminal and a cap plate and thus an improved stability.

An exemplary embodiment of the present invention provides a rechargeable battery, including: an electrode assembly; a case accommodating the electrode assembly; a cap plate combined with the case and having first and second terminal openings passing through the case from an inside to an outside; first and second seal gaskets inserted into the first and second terminal openings, respectively, and having insertion openings; and first and second terminals inserted into the insertion openings of the first and second seal gaskets, respectively, and electrically connected with first and second current collecting members of the electrode assembly, respectively, wherein sidewalls of the first and second gasket seals, which are brought into contact with inner walls of the first and second terminal openings, are inclined with respect to center axes of the first and second terminal openings.

The sidewalls of the first and second seal gaskets may be inclined with respect to the inner walls of the first and second terminal openings, respectively.

Here, inner walls of the insertion openings of the first and second seal gaskets may be inclined with respect to the sidewalls of the first and second terminals, respectively.

The first and second terminals may be inclined with respect to inner walls of the insertion openings of the first and second seal gaskets, respectively.

The outer diameter of a first end portion of the seal gasket, which is positioned inside the case, may be greater than the outer diameter of a second end portion, which is positioned outside the case.

The first and second terminals may each be a rod with a circular cross-section, and the first and second current collecting members may each be a rod with a polygonal cross-section.

The seal gasket may be formed of a perfluoroalkoxy (PFA).

The rechargeable battery may further include a molding member wrapping the seal gaskets.

According to an embodiment of the present invention, the formation of the gaskets improves the sealing strength around terminals, thereby preventing or reducing the leaking of an electrolyte or the penetration of moisture or the like, leading to no short circuit, thus providing a rechargeable battery with improved stability.

DETAILED DESCRIPTION

Figure 1:
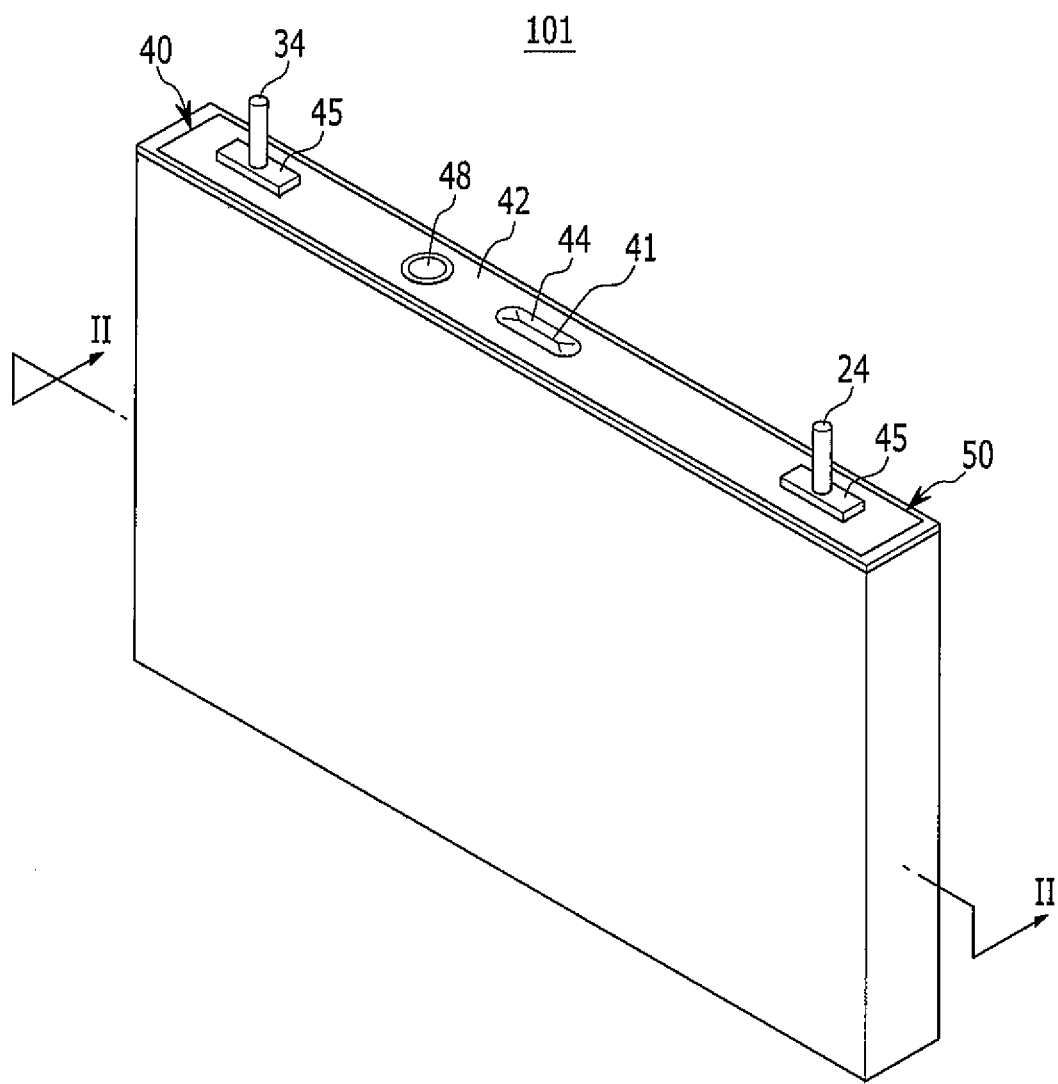
FIG. 1 is a perspective view of a rechargeable battery according to an exemplary embodiment of the present invention.

Hereinafter, embodiments of the present invention will be described in detail with reference to the accompanying drawings so that those skilled in the art can easily carry out the embodiments of the present invention. However, the present invention may be embodied in many different forms, and should not be construed as being limited to the embodiments set forth herein. In addition, like reference numerals denote like elements in the specification and the accompanying drawings.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the singular forms "a" and "an" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Figure 2:
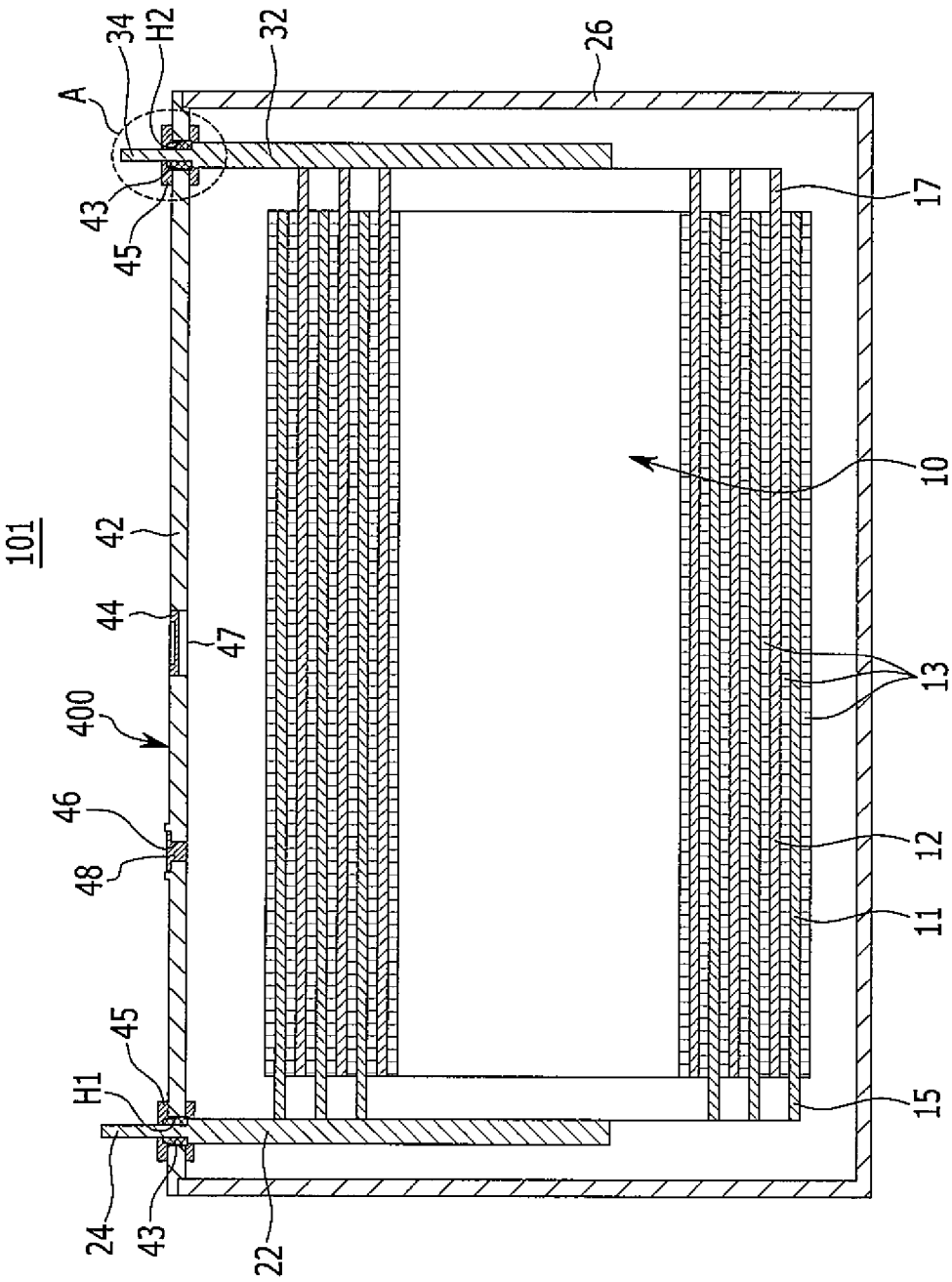
FIG. 2 is a cross-sectional view taken along line II-II of FIG. 1.

FIG. 1 is a perspective view of a rechargeable battery according to an exemplary embodiment of the present invention, and FIG. 2 is a cross-sectional view taken along the line II-II of FIG. 1.

Referring to FIGS. 1 and 2, a rechargeable battery according to an exemplary embodiment of the present invention includes an electrode assembly 10 in which a positive electrode 11, a negative electrode 12, and a separator 13 interposed therebetween are wound together, a case 26 accommodating the electrode assembly 10 therein, and a cap assembly 400 combined with an opening of the case 26.

The rechargeable battery 101 will be described in reference to a lithium ion rechargeable battery with a prismatic shape, for example. However, the present invention is not limited thereto, and the present invention can be applied to various types of batteries such as a lithium polymer battery, a cylindrical battery, and/or the like.

The positive electrode 11 and the negative electrode 12 each include a coated area where a current collector, formed of a thin metal foil, is coated with an active material, and an uncoated area where the current collector is not coated with the active material.

The positive electrode uncoated area 15 is formed on one side end of the positive electrode 11 in a length direction of the positive electrode 11. The negative electrode uncoated area 17 is formed on one side end of the negative electrode 12 in a length direction of the negative electrode 12. In addition, the separator 13, which is an insulator, is interposed between the positive electrode 11 and the negative electrode 12, and then the positive electrode 11, the negative electrode 12, and the separator 13 are wound together.

However, the present invention is not limited thereto, and the electrode assembly 10 may have a structure in which the positive electrode and the negative electrode which are formed by a plurality of sheets, and are laminated with the separator interposed between the sheets.

The case 26 has a substantially rectangular parallelepiped shape, and an opening is formed at one end (e.g., a top end) of the case 26.

The cap assembly 400 includes: a cap plate 42 covering the opening of the case 26; a first terminal 24 protruding outwardly from the cap plate 42 and electrically connected with the positive electrode 11; a second terminal 34 protruding outwardly from the cap plate 42 and electrically connected with the negative electrode 12; and a vent member 44 having a notch 41 configured to fracture at a set internal pressure.

The bent member 44 is installed to close a vent hole (e.g., opening) 47 formed in the cap plate 42.

The cap plate 42 is a thin metal plate, which may be formed of aluminum or an aluminum alloy, for example. A sealing plug 48 is put in an electrolyte injection hole (e.g., opening) 46 formed through one side of the cap plate 42 and the sealing plug may be fixed to the cap plate 42.

The first terminal 24 and the second terminal 34 pass through terminal holes (e.g., openings) H1 and H2 formed in the cap plate 42, and are electrically connected to the electrode assembly 10.

That is, the first terminal 24 is electrically connected with the positive electrode 11 via a current collecting member 22, and the second terminal 34 is electrically connected with the negative electrode 12 via a current collecting member 32. Further, the first terminal 24 may be formed of aluminum and the second terminal 34 may be formed of copper, for example.

The first terminal 24 and the second terminal 34 may each be fixed to seal the terminal holes H1 and H2 by a seal gasket 43 and a molding member 45.

The first terminal 24 and the second terminal 34 are each inserted into an insertion hole Q of the seal gasket 43, and the seal gasket 43 is wrapped in the molding member 45. In other words, molding member 45 wraps around the seal gasket 43.

The seal gasket 43 is not influenced by the electrolyte, and may be formed of an elastic material, e.g., a perfluoroalkoxy (PFA). The molding member 45 may be formed of a thermoplastic material, which is a material having excellent heat resistance and small mold shrinkage, e.g., polyphenylene sulfide (PPS).

The molding member 45 may be formed using a nano-molding technology (NMT) while the first terminal 24 is installed on the cap plate 42.

Here, the molding member 45 may be molded after performing a pretreatment for removing burrs from the first terminal and the second terminal before the NMT process. The first terminal 24, which may be made of aluminum, may be deburred by mixing sodium carbonate ($Na_2CO_3$) and tribasic anhydrous sodium phosphate ($Na_3PO_4$) in concentrations of 10 g/l to 30 g/l, respectively, and then performing electropolishing or electroless polishing at a temperature of 30 to 80° C. for 10 to 600 s.

In addition, the second terminal, which may be made of copper, may be deburred by mixing 1 g/l to 5 g/l of sodium hydroxide (NaOH), 10 g/l to 30 g/l of sodium carbonate ($Na_2CO_3$), and 10 g/l to 30 g/l of tribasic anhydrous sodium phosphate, and then performing electropolishing or electroless polishing at a temperature of 30 to 80° C. for 10 to 600 s.

When the molding member is formed by the NMT method, the molding member 45 is formed and is fixed to the cap plate 42, and can be stably fixed to the cap plate 42 while wrapping the seal gasket 43 together with the first terminal 24 and the second terminal 34.

Figure 3:
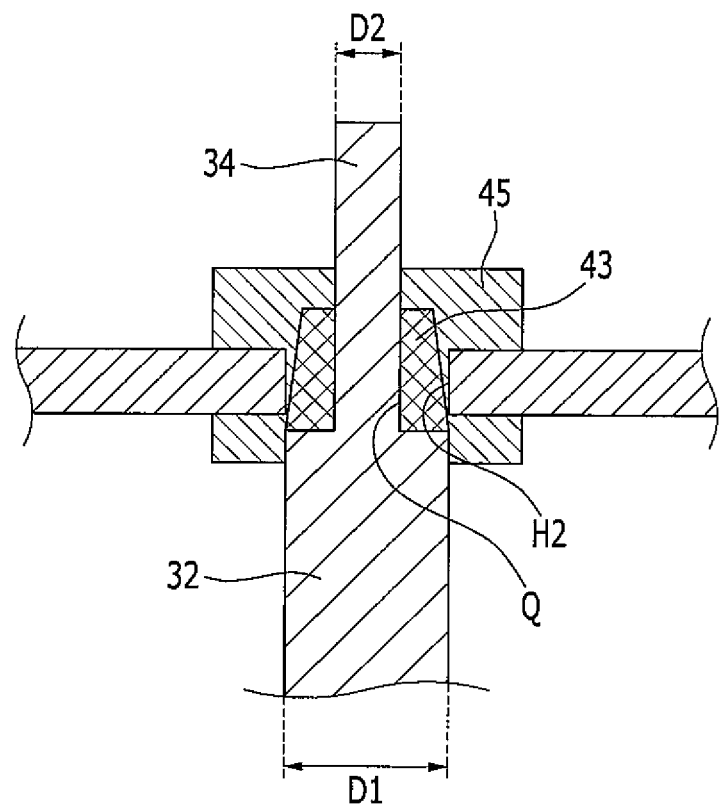
FIG. 3 is an enlarged view of part A of FIG. 2.
Figure 4:
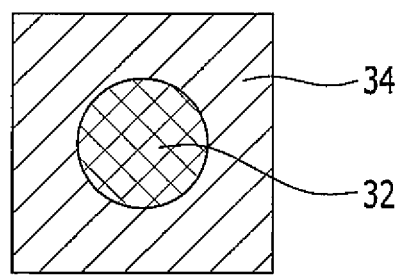
FIG. 4 is a plane view of a structure including a terminal and a current collecting member according to an exemplary embodiment of the present invention.
Figure 5:
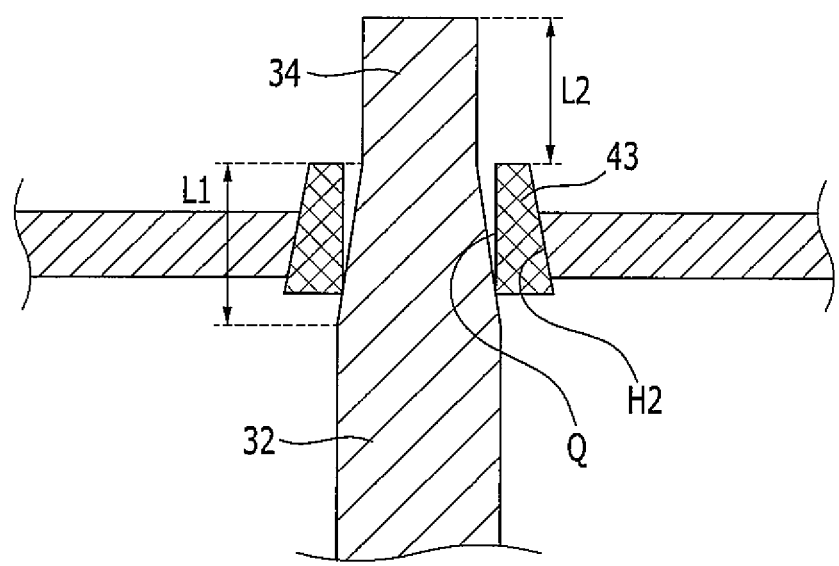
FIGS. 5 and 6 are enlarged views of part A of FIG. 2 in rechargeable batteries according to other exemplary embodiments of the present invention.
Figure 6:
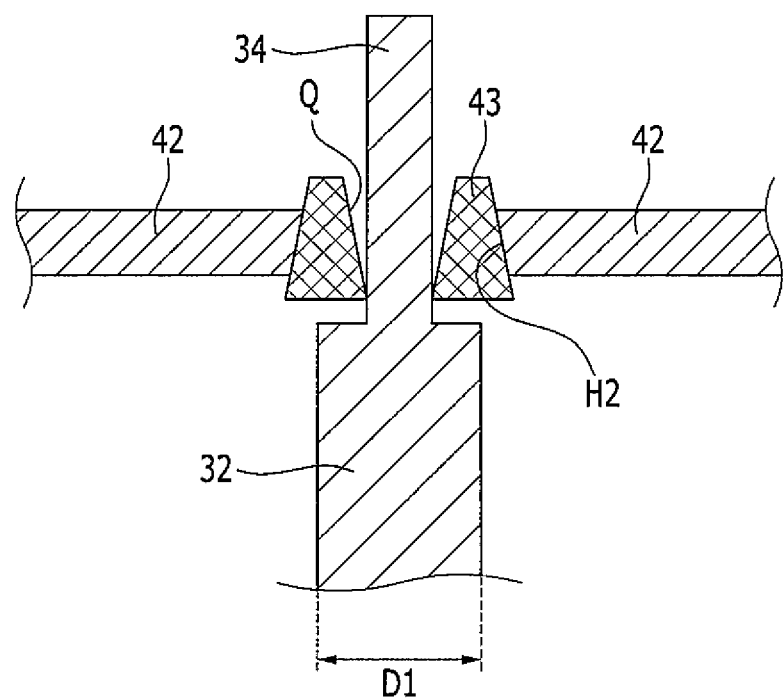

FIG. 3 is an enlarged view of part A of an embodiment of the present invention, FIG. 4 is a plane view of a structure including a terminal and a current collecting member according to an exemplary embodiment of the present invention, and FIGS. 5 and 6 are enlarged views of part A of FIG. 2 in rechargeable batteries according to other exemplary embodiments of the present invention.

Referring to FIGS. 3 and 4, the second terminal 34 and members combined with the second terminal 34 are symmetrical to the first terminal 24 and members combined with the first terminal 24, and thus the descriptions of the second terminal 34 and the members combined with the second terminal 34 are substantially the same as descriptions of the first terminal 24 and the members combined with the first terminal 24. As such, descriptions of the first terminal 24 and the members combined with the first terminal 24 may be omitted herein.

The second terminal 34 may be a rod with a circular cross-section, and one end of the second terminal 34, which is positioned in the case 26, is connected with one end of a current collecting member 32. The second terminal 34 is easily inserted into an insertion hole (e.g., opening) Q, and the circular cross-section of the second terminal 34 may increase the adhesion.

The current collecting member 32 is a rod having a polygonal cross-section, and the width D1 of the current collecting member 32 may be greater than the width (e.g., diameter) D2 of the second terminal 34.

The second terminal and the current collecting member 32 may be integrally formed, or may be separately formed and then connected by welding or the like.

The outer diameter of a first end portion of the seal gasket 43, which is positioned inside the case, is greater than the outer diameter of a second end portion of the seal gasket 43, which is positioned outside the case, and thus the longitudinal section of the seal gasket 43 may have a trapezoid shape of which the width becomes narrower upwards and the sidewalls are inclined. That is, the outer diameter of the second end portion of the seal gasket 43 may be smaller than the diameter of the terminal hole H2, and the outer diameter of the first end portion of the seal gasket 43 may be greater than the diameter of the terminal hole H2. Further, the outer diameter of the second end portion may be smaller than the outer diameter of the first end portion.

When the sidewall of the seal gasket 43 is formed to be inclined, the seal gasket 43 completely adheres to an inner wall of the terminal hole H2 by a wedge action between the terminal hole H2 and the sidewall of the seal gasket 43, and thus completely seals the terminal hole H2. Here, as the seal gasket 43 closely adheres to the inner wall of the terminal hole H2, the inner wall of the insertion hole of the seal gasket 43 is pushed toward the second terminal, and thus the inner wall of the insertion hole Q and the second terminal 34 closely adhere to each other, thereby completely sealing the insertion hole Q.

FIG. 3 shows that the seal gasket 43 is in contact with only the lower edge of the terminal hole H2. However, the seal gasket 43 presses the inner wall of the terminal hole H2 while being inserted into the terminal hole H2, and thus the overall inner wall of the terminal hole H2 may be in contact with the seal gasket 43. Here, since the seal gasket 43 may have elasticity, a portion of the seal gasket 43, which is in contact with the inner wall of the terminal hole H2, may be dented when compared with the other portion of the seal gasket 43.

As shown in an exemplary embodiment of the present invention, when the sidewall of the seal gasket is formed to be inclined, the terminal hole may be completely sealed by a wedge action. Therefore, the permeation of moisture through the terminal hole from the outside can be prevented or reduced.

In addition, when the seal gasket 43 is formed of PFA, the matching (e.g., the fit) between the seal gasket 43 and the molding member 45 of PPS is excellent, and thus the sealing strength can be further improved.

FIG. 3 shows an exemplary embodiment of the present invention in which the external sidewall of the seal gasket 43 is inclined, but as shown in FIGS. 5 and 6, the sidewalls of the first terminal and the second terminal 34 may be inclined or the inner wall of the insertion hole Q may be inclined.

For example, as shown in FIG. 5, the second terminal 34 may have a first portion L1 which is inserted into the seal gasket 43 and a second portion L2 which protrudes outwardly from the cap plate 42.

The first portion L2 is inclined with respect to the inner wall of the insertion hole Q, and the second portion L2 has the same or substantially the same inclination as the inner wall of the insertion hole Q. However, as needed, the second terminal may include only a first portion which is inclined with respect to the inner wall of the insertion hole Q.

When a portion of the second terminal 34, which is inserted into the insertion hole Q, is inclined with respect to the inner wall of the insertion hole Q, as described above, the second terminal 34 is inserted into the insertion hole Q to closely adhere to the inner wall of the insertion hole Q, so that the insertion hole Q is completely sealed by the second terminal 34.

In addition, as shown in FIG. 6, the second terminal 34 may be a circular rod of which the diameter is constant, as in FIG. 2.

Alternatively, the inner wall of the insertion hole Q may be inclined with respect to the second terminal 34. That is, the diameter of the insertion hole Q may be decreased toward an upper portion thereof which is adjacent to the outside of the case from a lower portion thereof which is adjacent to the inside of the case.

As such, when the inner wall of the insertion hole Q is inclined, the second terminal 34 is inserted into the insertion hole Q, and thus the inner wall of the insertion hole closely adheres to the second terminal 34, so that the insertion hole Q is completely sealed by the second terminal 34.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims and their equivalents.

DESCRIPTION OF SOME OF THE SYMBOLS

10: electrode assembly
11: positive electrode
12: negative electrode
13: separator
15: positive electrode uncoated region
17: negative electrode uncoated region
22, 32: current collecting members
24: first terminal
26: case
34: second terminal
41: notch
42: cap plate
43: seal gasket
44: vent member
45: sealing member
46: injection hole
47: vent hole
48: sealing plug
101: rechargeable battery
400: cap assembly
H1, H2: terminal holes
Q: insertion opening

What is claimed is:

1. A rechargeable battery, comprising:
an electrode assembly;
a case accommodating the electrode assembly;
a cap plate combined with the case and having first and second terminal openings passing through the case from an inside to an outside;
first and second seal gaskets inserted into the first and second terminal openings, respectively, and having insertion openings; and
first and second terminals inserted into the insertion openings of the first and second seal gaskets, respectively, and electrically connected with first and second current collecting members of the electrode assembly, respectively,
wherein sidewalls of the first and second seal gaskets, which are brought into contact with inner walls of the first and second terminal openings, are inclined with respect to center axes of the first and second terminal openings, and
wherein the sidewalls of the first and second seal gaskets are inclined with respect to the inner walls of the first and second terminal openings, respectively.

2. The rechargeable battery of claim 1,
wherein inner walls of the insertion openings of the first and second seal gaskets are inclined with respect to the sidewalls of the first and second terminals, respectively.

3. The rechargeable battery of claim 1,
wherein the first and second terminals are inclined with respect to inner walls of the insertion openings of the first and second seal gaskets, respectively.

4. The rechargeable battery of claim 1,
wherein an outer diameter of a first end portion of respective one of the first and second seal gaskets, which is positioned inside the case, is greater than the outer diameter of a second end portion of the respective one of the first and second seal gaskets, which is positioned outside the case.

5. The rechargeable battery of claim 1,
wherein the first and second terminals are each a rod with a circular cross-section, and the first and second current collecting members are each a rod with a polygonal cross-section.

6. The rechargeable battery of claim 1,
wherein at least one selected from the first and second seal gaskets is formed of a perfluoroalkoxy (PFA).

7. The rechargeable battery of claim 1, further comprising:
a molding member wrapping respective one of the first and second seal gaskets.

* * * * *